Figure 1:
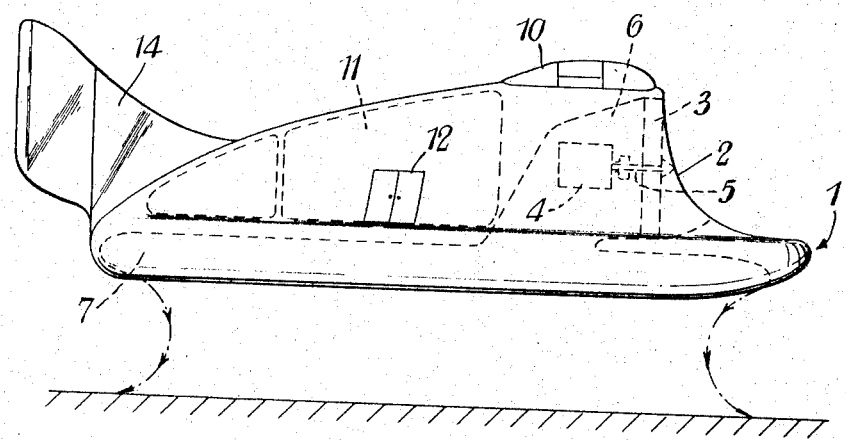

Jan. 16, 1968   C. S. COCKERELL   3,363,716
VEHICLES FOR TRAVELLING OVER LAND AND/OR WATER
Filed Dec. 12, 1956
2 Sheets-Sheet 1

Inventor:
Christopher Sydney Cockerell
By his attorneys:
Baldwin & Wight

Jan. 16, 1968   C. S. COCKERELL   3,363,716
VEHICLES FOR TRAVELLING OVER LAND AND/OR WATER
Filed Dec. 12, 1956   2 Sheets-Sheet 2

Inventor:
Christopher Sydney Cockerell
By his attorneys:
Baldwin & Wight

United States Patent Office 3,363,716
Patented Jan. 16, 1968

3,363,716
VEHICLES FOR TRAVELLING OVER LAND AND/OR WATER
Christopher Sydney Cockerell, Lowestoft, England, assignor to Hovercraft Development Limited, a company of the United Kingdom of Great Britain and Northern Ireland
Filed Dec. 12, 1956, Ser. No. 627,925
Claims priority, application Great Britain, Dec. 12, 1955, 35,656/55
32 Claims. (Cl. 180—122)

This invention relates to vehicles for travelling over land and/or water and may be applied to ships or aircraft or land-going vehicles or to vehicles which represent a combination thereof.

According to the invention there is provided a vehicle, wherein means are arranged to discharge at least one jet of fluid in the form of a curtain which effectively encloses a space beneath the underside of the vehicle and a surface over which the vehicle is to hover or travel, the discharging means being arranged to expel the jet of fluid with a total thrust which is substantially less than the total weight of the vehicle, the arrangement being such that, when the discharging means is in operation forming the curtain of fluid, pressures can be built up within said space to the extent that is necessary to support or assist in supporting the vehicle out of contact with the surface.

The curtain of fluid acts as an envelope which encloses a cushion of air beneath the vehicle, and, where the fluid is air, the air pressure in the cushion can build up to an extent which is necessary to raise the vehicle out of contact with the surface. Where the fluid is not air, but is, for instance, water, the vehicle is provided with means for pumping air into the space beneath the vehicle to build up the pressure in such space to the required value. In either case, the curtain of fluid acts after the manner of the walls of a pneumatic tyre and serves to contain the necessary pressure for supporting the vehicle.

Since the total thrust of the jet of fluid forming the curtain is less than the weight of the vehicle, the vehicle of the invention is distinct from vertical take-off craft in which the total downward thrust of the jets employed must be at least equal to the total weight that they support. The vehicle of the present invention is not able to be supported by the pressurized cushion of air within the curtain at great and indefinite heights above the ground but only at a height which depends upon inter-relationships between the weight of the vehicle, the plan area enclosed by the curtain and the power of the means for discharging the fluid.

Figure 2:
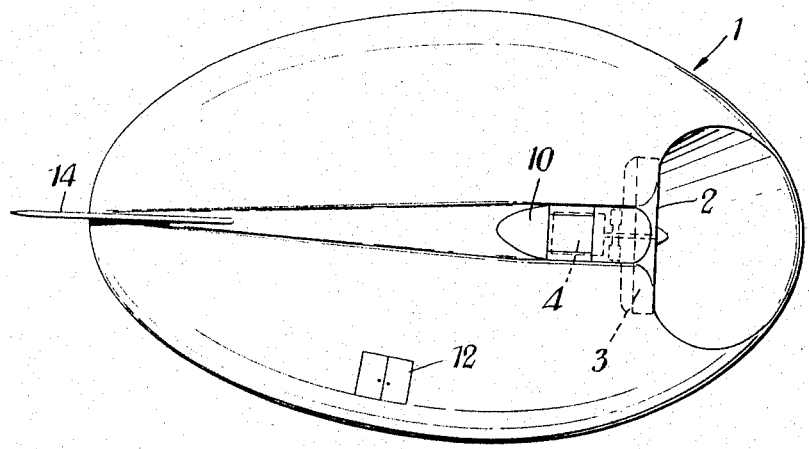
Figure 3:
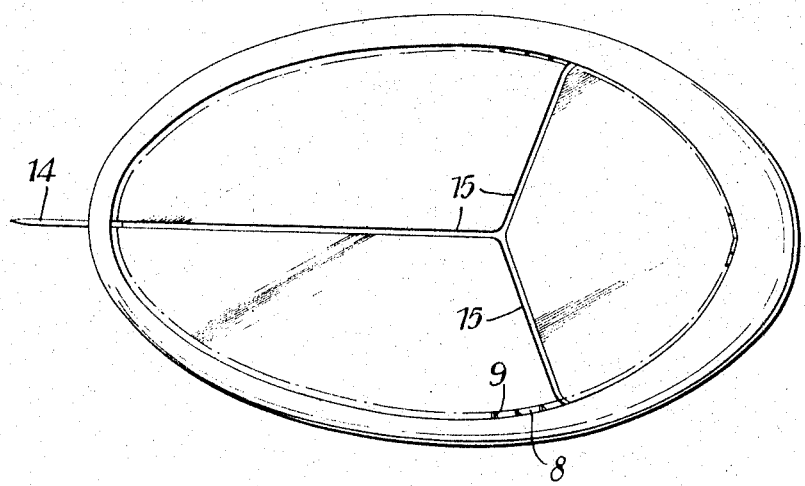
Figures 4, 5:
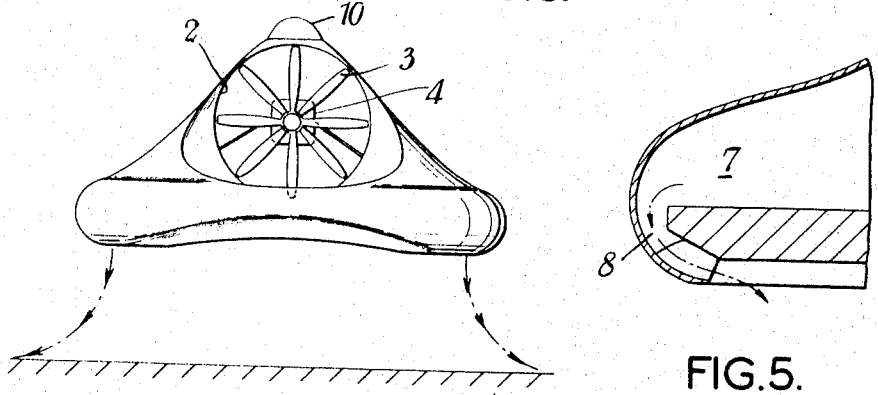
Figure 6:
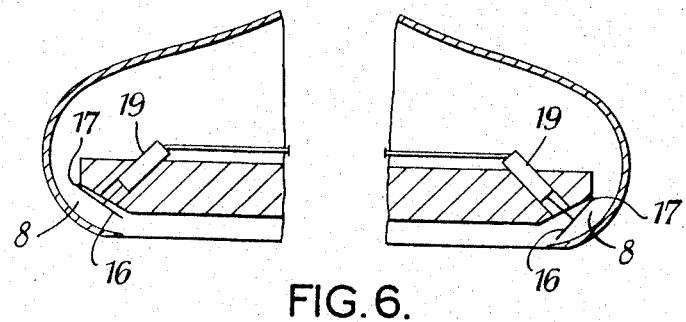

For a better understanding of the invention, and to show how the same may be carried into effect, reference will now be made to the accompanying diagrammatic drawings in which:

FIGURE 1 is a side elevation of a vehicle for travelling over land and/or water, FIGURE 2 is a top plan view of the vehicle shown in FIGURE 1, FIGURE 3 is a bottom plan view of the vehicle shown in FIGURE 1, FIGURE 4 is a front elevation of a modified form of the vehicle shown in FIGURE 1, FIGURE 5 is a cross-sectional detail of part of the vehicle shown in FIGURE 1, and FIGURE 6 is a cross-sectional view of part of a modification of the vehicle shown in FIGURE 1.

Referring now to FIGURES 1 to 5 of the drawings, there is shown a vehicle 1 for travelling over land and/or water The vehicle body is streamlined and generally egg-shaped in plan view, being narrower at the rear end than at the front end, and has a flat bottom. At its front end, the vehicle body has an opening 2 in which a double, four-bladed propeller 3 is mounted, there being a motor 4 for rotating the propeller 3 which is connected to the motor 4 by means of a driving shaft 5. The opening 2 leads into a chamber 6 formed in the vehicle, and the chamber 6 in turn communicates with a peripherally extending tunnel 7 leading to a peripherally extending mouth 8 formed around the bottom of the vehicle. As is shown best in FIG. 5, the mouth 8 of the vehicle illustrated in FIGS. 1–3 and 5 is inclined downwardly and inwardly with respect to the periphery of the vehicle body and is subdivided by a plurality of vanes 9 which are so arranged that, when a jet of air is forced through the mouth, the jet is directed with a velocity component which is inwards and with a velocity component which is rearwards of the vehicle. The integrated mean direction of flow of the air issuing from mouth 8 is thus inwards relative to the periphery of the vehicle, but with a rearward resultant component when resolved in the fore and aft direction. By the term "integrated mean direction" is meant the direction of net flow with respect to the periphery of the area bounded by the jet mouth, integrated over the whole of said periphery.

Located above the chamber 6 is a cockpit 10 for the pilot of the vehicle, from whence the pilot can control the vehicle. A hold or bay 11 is formed behind the chamber 6, the hold 11 being adapted for the reception of the load the vehicle is to carry. There are doors 12 which lead into the hold 11 and the vehicle can be loaded by conveying the goods up a ramp. The hold 11 may, however, be adapted for the reception of passengers, in which case the walls of the hold will be provided with windows (not shown). The vehicle has, at its rear end, a tailplane 14 which may be used to assist in steering the vehicle.

In the operation of the vehicle, the motor 4 rotates the propeller 3 which induces a large volume of air into the chamber 6 from whence the air passes through the tunnel 7 and out of the mouth 8. Assuming for the moment that the vanes 9 do not direct the air with a velocity component which is rearwards of the vehicle, i.e. the vanes are effectively omitted, then the air forms a curtain extending peripherally from and enclosing the bottom of the vehicle, the curtain marginally delineating a space between the underside of the vehicle body and a surface over which the vehicle is to hover or travel. The curtain initially extends almost horizontally beneath the vehicle and soon sufficient pressure builds up beneath the vehicle to deflect the curtain so that it impinges upon the ground. As the pressure rises in the space enclosed between the curtain, the bottom of the vehicle and the ground, the pressure will act upon the bottom of the vehicle and will lift the vehicle. The pressure will also act upon the curtain and will further deflect the same to a position where, when seen in vertical section, the curtain will follow a curved path with a mean radius of curvature equal to about half the height of the bottom of the vehicle from the ground and with centres of curvature disposed outside the envelope and substantially vertically beneath the peripheral edge of the bottom of the vehicle, as shown in FIGURE 1 where the curtain is shown in chain-dotted lines. The pressure within the envelope can build up rapidly to the point where the vehicle is supported upon the air trapped within the envelope so that the vehicle is sustained over the ground upon an air cushion just as effectively as though the vehicle were resting upon a ballon tyre.

As indicated above, the pressure within the envelope will automatically build up to that required for the support of the vehicle itself. It will however be appreciated that once the continuous curtain has been established with the aid of the jet, the envelope may be directly filled by forcing air through an appropriate orifice in the bottom of the vehicle as will be explained hereinafter.

Once the vehicle is in spaced relationship from the ground and supported upon the air cushion within the described envelope, the vehicle is propelled forwardly over the ground by the overall backward inclination at the jet curtain due to the overall backward inclination of the vanes 9, since the jet curtain possesses a component which will react upon the vehicle in a horizontal plane to cause the same to be translated over the ground whilst in spaced relation therefrom. Although for simplicity the movement of the vehicle has been considered in two parts, namely purely vertical movement with the vanes 9 effectively omitted and forward movement due to the backward inclination of the vanes, it will be appreciated that the actual movement of the vehicle is a combination of the two movements and that the curtain of air will have a somewhat different shape from that described.

As the vehicle gathers speed, the head pressure will increase and may well approach the pressure of the air within the envelope on which the vehicle is supported. It will be evident that when the head pressure and the envelope pressure are equal there is no necessity to maintain that part of the curtain at the forward end of the vehicle, although, of course, sufficient of the sides of the curtain and the after end thereof must be preserved as will ensure that the appropriate pressure will be maintained beneath the vehicle for the support thereof.

In the arrangement described above, the mouth 8 through which the jet is projected directs the jet mainly inwards, as indicated in FIGURES 1 and 5. As an alternative the mouth 8 may be such that the jet is directed vertically downwards, as indicated in FIGURE 4, so that the curtain strikes the ground with the result that the air will flow both inwardly beneath the bottom of the vehicle and outwardly away from the bottom of the vehicle. Hence, pressure will begin to rise in the space enclosed between the curtain, the underside of the vehicle and the surface beneath the vehicle. The pressure will again act upon the underside of the vehicle so tending to lift the vehicle, and will also act upon the enveloping curtain thereby causing the lower part of the curtain adjacent the ground to become bell-mouthed. Thus, as seen in vertical section, as in FIGURE 4, the curtain will not appear as a vertical jet but will be an arcuately extending jet having a centre of curvature outside the envelope formed by the curtain and a radius of curvature substantially equal to the height of the bottom of the vehicle from the ground. Again the pressure within the envelope can build up rapidly to point where the vehicle is supported upon the air trapped within the envelope so that the vehicle is sustained over the ground upon an air cushion just as effectively as though the vehicle were resting upon a balloon tyre.

It will be appreciated that because the vehicle is supported upon an air cushion, the vehicle will tend to be unstable in the sense that if one side of the vehicle is moved downwardly there will be no tendency for the vehicle to right itself. One way of overcoming this difficulty is to divide the air cushion by means of further jets of air which are projected through slots 15 (FIGURE 3) formed in the bottom of the vehicle, the slots 15 being in communication with the chamber 6. By forcing air through the slots 15, there is also obtained the result that the envelope formed by the curtain is directly filled with air as hereinbefore referred to.

The vehicle shown in FIGURES 1 to 5 is intended for predominantly forward travel and is steered only by the tailplane 14, the forward propulsion being obtained by virtue of the backward inclination of the vanes 9. However, where it is desired to move the vehicle in any direction it becomes necessary either to provide means for altering the inclination of the vanes 9, or to provide means for locally altering the width of the mouth 8 since by making the jet curtain thinner at one side of the vehicle than the other the vehicle will move in the direction of the attenuation of the curtain. This is due to the fact that the vehicle drops at the position at which the curtain is attenuated, with the result that the curtain pressure produces a resultant thrust towards that position. By asymmetrical attenuation of the curtain at two points it is possible to produce a turning moment on the vehicle for steering. It will be understood that local attenuation of the curtain alters the trim of the vehicle and conversely a lack of trim can be adjusted by local attenuation of the curtain.

Referring now to FIGURE 6, there is shown an arrangement for attenuating the jet curtain at one or the other side of the vehicle. Two flaps 16 are pivotally secured at 17 in the mouth 8. Each flap 16 is displaceable about its pivot 17 with the aid of a hydraulic motor 19. Thus on one side of the vehicle a flap 16 can be displaced outwardly so as effectively to reduce the width of the mouth 8, whilst on the other side of the vehicle the flap 16 can remain in its inner position. In this way the vehicle will tend to turn about that side where the flap has been outwardly displaced.

The vehicles so far described are capable of travelling over land or over sea at high speeds, and the body of the vehicle is designed to obtain aerodynamic lift, so as to assist in supporting the vehicle. The invention may also be applied to aircraft for the purpose of safely landing the aircraft. Thus an aircraft may be provided with means for producing a supporting air cushion when the aircraft is near to the land or sea surface, so that in effect the aircraft will land upon the cushion employing the same instead of the conventional undercarriage of land or sea aircraft. It is also obvious that the invention may be embodied in a vehicle which, while capable of moving from place to place over land or water, normally functions as a relatively stationary platform, such as a radar picket vessel.

In describing the construction of a vehicle made in accordance with the invention, reference has been made to the employment of air jets. It will be understood that in principle any gaseous medium can be employed instead of air. Moreover, a curtain could also be formed by discharging water through the jet mouth to form a liquid envelope in like manner.

In the above description, reference has been made to the building up of a pressure within the jet curtain sufficient to support the weight of the vehicle. It is convenient to consider that an air cushion of uniform pressure can be established. In practice, the pressure within the cushion will not be uniform, but this is of little consequence provided that the mean pressure, when multiplied by the plan area of the surface on which it acts, is equal to the weight of the vehicle less the, or any, resultant downward thrust which may be obtained from the jet curtain itself, and less any aerodynamic lift that the vehicle may experience during motion. Although the motion of the vehicle may, in the way described above, arise as the result of asymmetry of the jet curtain itself, it is to be understood that the vehicle may be equipped with engines specifically and separately for the purpose of propelling it.

From the description above it would appear that the jet curtain may be directed mainly inwards, i.e. horizontally, or, alternatively, vertically downwards. In practice, the jet curtain will be directed at angles between the horizontal and vertical depending upon the component of downward thrust it is desired to employ for counteracting the weight of the vehicle. This component will in turn be determined by the ratio of the total jet thrust in relation to the weight of the vehicle, and by the locality in the vehicle where the latter is asymmetrical in plan.

I claim:

1. A method of supporting a vehicle above and in close proximity to a surface over which the vehicle is to hover or travel comprising the steps of discharging from the lower part of said vehicle at least one curtain of moving fluid which travels across the gap existing between said surface and the body of the vehicle and which, in combination with said body and said surface, at least partially encloses a gas-containing space between the underside of said vehicle and said surface, so controlling the integrated mean direction of flow of said curtain as it leaves the vehicle that said flow is inwards relative to said vehicle at an angle to the vertical, so controlling said discharge that the thrust on said vehicle created by the discharge therefrom of said curtain of moving fluid is at all times substantially less than the weight of the vehicle, and producing within said space a cushion of gas having a pressure which, as augmented by whatever vertical component of the thrust of said curtain and whatever aerodynamic lift may be present, is sufficient to support the body of said vehicle at a height above said surface which is small in relation to the size of said vehicle.

2. A method as claimed in claim 1 including the step of varying the direction of flow of a limited portion of said curtain as it leaves the vehicle so as to impart motion to said vehicle.

3. A method as claimed in claim 1 including the step of attenuating said curtain at a selected location so as to impart movement to said vehicle in the direction of said location.

4. A method as claimed in claim 1 including the step of decreasing the effective thickness of said curtain at a selected location on the periphery thereof so as to cause said vehicle to move in the direction of said location.

5. A vehicle capable of hovering or travelling over and in close proximity to a surface at a height which is small in relation to the size of said vehicle comprising a body, means on said body to sealingly and laterally circumscribe a space between said surface and said body, said means including means for causing at least one stream of fluid to issue from the lower part of said body and to form at least one curtain of moving fluid beneath said body which has a component of velocity across the gap existing between said surface and said body, whereby a cushion of gas may be formed and retained within said circumscribed space having a pressure sufficient in relation to the area of the underside of said vehicle on which said pressure acts to support the major part of the weight of the vehicle, said curtain forming means including means for so controlling the flow of said fluid that the integrated mean direction of said flow as the fluid issues from said body is inwards relative to the periphery of the vehicle, and means for imparting energy to said fluid, the power capability of said last-named means being so limited that at all times the thrust produced by said fluid as it finally leaves the vehicle is substantially less than the total weight of said vehicle.

6. A vehicle capable of hovering or travelling over and in close proximity to a surface at a height which is small in relation to the size of said vehicle as claimed in claim 5 wherein said body has a substantially horizontally extending underside, and wherein said curtain extends adjacent to and conforms with at least part of the periphery of the substantially horizontally extending underside of said body.

7. A vehicle of the character described comprising a body having a fluid intake, a relatively narrow, substantially continuous fluid outlet port in the lower part of said body extending adjacent and conformative to at least a part of the periphery thereof, and means for drawing fluid through said intake and causing said fluid to issue from said outlet port, said means and said outlet port being so constructed and arranged as to expel the fluid from said port downwardly in the form of a relatively thin jet curtain having an integrated mean direction of flow when it issues from said port which is inwards relative to the periphery of the area of the bottom of said body within said port, said area being a number of times greater than the total area of said port.

8. A vehicle capable of hovering or travelling over and in close proximity to a surface at a height which is small in relation to the size of said vehicle comprising a body, means on said body to sealingly and laterally circumscribe a space between said surface and said body, said means including means for causing fluid to so issue from the lower part of said body as to cause the formation of at least one curtain of moving fluid having a component of velocity across the gap existing between said body and said surface, whereby a cushion of gas may be formed and retained within said circumscribed space having a pressure sufficient to support the major part of the weight of the vehicle, the area of the vehicle on which the upward pressure of the pressurised gas is exerted being equal to at least the major part of the underside of said vehicle, said curtain forming means including means for so controlling the flow of said fluid that the integrated mean direction of said flow as the fluid issues from said body is inwards relative to the periphery of the vehicle, and means for imparting energy to said fluid, the power capability of said last-named means being so limited that at all times the thrust produced by said fluid as it finally leaves the vehicle is substantially less than the total weight of said vehicle.

9. A vehicle capable of hovering or travelling over and in close proximity to a surface at a height which is small in relation to the size of said vehicle comprising a body, means on said body to sealingly and laterally circumscribe a space between said surface and said body, said means including means for forming at least one curtain of moving fluid beneath said body, whereby a cushion of gas may be formed and retained within said circumscribed space having a pressure and a plan area sufficient to support at least the major part of the weight of the vehicle, said curtain forming means including means for causing fluid to issue from the lower part of said body with a direction of flow which makes an angle with a horizontal plane within said gas-containing space of less than 90° at all points around the periphery of said curtain, and means for imparting energy to said fluid, the power capability of said last-named means being so limited that at all times the thrust produced by said fluid as it finally leaves the vehicle is substantially less than the total weight of said vehicle.

10. A vehicle capable of hovering or travelling over and in close proximity to a surface at a height which is small in relation to the size of said vehicle, comprising a body, means on said body to sealingly and laterally circumscribe a space between said surface and said body, said means including means for causing fluid to so issue from the lower part of said body as to cause the formation of at least one curtain of moving fluid having a component of velocity across the gap existing between said body and said surface, whereby a cushion of gas may be formed and retained within said circumscribed space having a pressure which is sufficient to at least partially support the weight of the vehicle, said curtain forming means including means for so controlling the flow of said fluid that the integrated mean direction of said flow as the fluid issues from said body is inwards relative to the periphery of the vehicle, and means for imparting energy to said fluid in such amount that the thrust produced by said fluid as it finally leaves the vehicle is substantially less than the total weight of said vehicle.

11. A vehicle as claimed in claim 10 including means for forcing gas into the gas-containing space enclosed by said curtain at a pressure sufficient to support the vehicle.

12. A vehicle capable of hovering or travelling over and in close proximity to a surface at a height which is small in relation to the size of said vehicle comprising a body, means for discharging a fluid jet downwardly from the lower part of said body in the form of an annular curtain of moving fluid or curved configuration having a component of velocity across the gap existing between said body and said surface, said curtain in combination with said body and said surface effectively enclosing a gas-containing space between the underside of said vehicle and said surface wherein a cushion of gas may be formed and retained having a pressure and a plan area sufficient to support the major part of the weight of the vehicle, the pressure of said cushion causing, and in turn being primarily contained due to, a change of direction of the moving fluid which results in the curved configuration of said curtain, said discharging means being so constructed and arranged that the fluid jet issues therefrom with a direction of flow which makes an angle with a horizontal plane within said gas-containing space of less than 90° at all points around the periphery of said curtain, and means for delivering fluid to said discharging means, the power capability of said last-named means being so limited that at all times the thrust produced by said fluid jet as it leaves the vehicle is substantially less than the total weight of said vehicle.

13. A vehicle as claimed in claim 12 wherein said fluid jet discharging means includes means for causing the fluid jet to flow with a resultant horizontal component of velocity so as to impart motion to the vehicle.

14. A vehicle as claimed in claim 12 wherein said fluid jet discharging means includes vanes for causing the fluid jet to flow with a velocity component rearwardly of the vehicle so as to propel the vehicle forwardly.

15. A vehicle as claimed in claim 12 including means operable locally in a selected portion of said discharging means for locally reducing the area of the fluid discharge path so as to effect movement of the vehicle in the direction of the locality of said reduction.

16. A vehicle capable of hovering or travelling over and in close proximity to a surface at a height which is small in relation to the size of said vehicle comprising a body, means for discharging a fluid jet downwardly from the lower part of said body in the form of an annular curtain of moving fluid of curved configuration having a component of velocity across the gap existing between said body and said surface, said curtain in combination with said body and said surface effectively enclosing a gas-containing space between the underside of said vehicle and said surface wherein a cushion of gas may be formed and retained having a pressure and a plan area sufficient to support the major part of the weight of the vehicle, the pressure of said cushion causing, and in turn being primarily contained due to, a change of direction of the moving fluid which results in the curved configuration of said curtain, said discharging means including a substantially continuously extending jet mouth so positioned that the mean direction of flow of the fluid jet issuing therefrom is inwards relative to the periphery of the vehicle, and means for delivering fluid to said discharging means, the power capability of said last-named means being so limited that at all times the thrust produced by said fluid jet as it leaves the vehicle is substantially less than the total weight of said vehicle.

17. A vehicle capable of hovering or travelling over and in close proximity to a surface at a height which is small in relation to the size of said vehicle comprising a body having an intake for fluid, means on said body to sealingly and laterally circumscribe a space between said surface and said body, said means including means for drawing fluid through said intake and causing said fluid to so issue from the lower part of said body so as to cause the formation of at least one curtain of moving fluid having a component of velocity across the gap existing between said body and said surface, whereby a cushion of gas is formed within said circumscribed space having a pressure which is sufficient in relation to the area of the underside of said vehicle on which said pressure acts to support the major part of the weight of the vehicle, the pressure of said cushion causing, and in turn being primarily contained due to, a change of direction of the moving fluid which results in a curvature of said curtain, the plan area of said pressurised cushion of gas being such that the upward pressure of said gas acts over an area equal to at least the major part of the underside of the vehicle, said curtain forming means being so constructed and arranged that the thrust produced by said fluid as it finally leaves the vehicle is at all times substantially less than the total weight of said vehicle, and means for so controlling the flow of the curtain forming fluid that the direction of said flow as the fluid issues from the body of the vehicle makes an angle with a horizontal plane within said gas-containing space of less than 90° at all points around the periphery of said curtain.

18. A vehicle capable of hovering or travelling over and in close proximity to a surface at a height which is small in relation to the size of said vehicle comprising a body having an intake for fluid, means on said body to sealingly and laterally circumscribe a space between said surface and said body, said means including means for drawing fluid through said intake and causing said fluid to so issue from the lower part of said body as to cause the formation of at least one curtain of moving fluid having a component of velocity across the gap existing between said body and said surface, whereby a cushion of gas is formed within said circumscribed space having a pressure which is sufficient in relation to the area of the underside of said vehicle on which said pressure acts to support the major part of the weight of the vehicle, the pressure of said cushion causing, and in turn being primarily contained due to, a change of direction of the moving fluid which results in a curvature of said curtain, the plan area of said pressurised cushion of gas being such that the upward pressure of said gas acts over an area equal to at least the major part of the underside of the vehicle, said curtain forming means being so constructed and arranged that the thrust produced by said fluid as it finally leaves the vehicle is at all times substantially less than the total weight of said vehicle, and means for so controlling the flow of the curtain forming fluid that the integrated mean direction of said flow as the fluid issues from the body of the vehicle is inwards relative to the periphery of said vehicle.

19. A vehicle capable of hovering or travelling over and in close proximity to a surface at a height which is small in relation to the size of said vehicle comprising a body having an intake for fluid, means on said body to sealingly and laterally circumscribe a space between said surface and said body, said means including means for drawing fluid through said intake and causing said fluid to so issue from the lower part of said body as to cause the formation of at least one curtain of moving fluid having a component of velocity across the gap existing between said body and said surface, whereby a cushion of gas is formed within said circumscribed space having a pressure which is sufficient in relation to the area of the underside of said vehicle on which said pressure acts to support the major part of the weight of the vehicle, the pressure of said cushion causing, and in turn being primarily contained due to, a change of direction of the moving fluid which results in a curvature of said curtain, the plan area of said pressurised cushion of gas being such that the upward pressure of said gas acts over an area equal to at least a major part of the underside of the vehicle, said curtain forming means being so constructed and arranged that the thrust produced by said fluid as it finally leaves the vehicle is at all times substantially less than the total weight of said vehicle, and control means for so acting on said curtain forming fluid that it issues from the vehicle in such a manner as to produce or eliminate a resultant horizontal thrust or turning moment on the vehicle, said control means including vanes in the path of said fluid which are so arranged as to impart to said fluid when it issues from the vehicle a component of motion in a direction opposite to that in which it is desired to propel or steer the vehicle.

20. A method of supporting a vehicle above and in close proximity to a surface over which the vehicle is to hover or travel comprising the steps of discharging from the lower part of said vehicle at least one curtain of moving liquid which travels across the gap existing between said surface and the body of the vehicle and which, in combination with said body and said surface, at least partially encloses a gas-containing space between the underside of said vehicle and said surface, so controlling said discharge that the thrust on said vehicle created by the discharge therefrom of said curtain of moving liquid is substantially less than the weight of the vehicle, and forcing a gas into the space enclosed by said curtain at a pressure sufficient to support the body of said vehicle at a height above said surface which is small in relation to the size of said vehicle.

21. A ground effect vehicle for travel over and in close proximity to a surface, comprising: a body having its bottom adapted to be vertically spaced above said surface and having a sufficient portion to be acted upon by underlying fluid pressure so that the weight of the vehicle may be sustained, means on said body to sealingly and laterally circumscribe a space between said surface and said bottom portion, said means including a jet nozzle positioned and dimensioned to direct a relatively thin jet sheet of fluid issuing from said nozzle downwardly and inwardly into impingement upon said surface whereby a portion of said jet sheet, as deflected by such impingement, flows into said circumscribed space and builds up therein a higher-than-atmospheric pressure; and means on said body for supplying pressurized fluid to said jet nozzle.

22. A ground effect vehicle for travel over and in close proximity to a surface, comprising: a body having a bottom portion adapted to be vertically spaced above said surface and of sufficient area to be acted upon by underlying fluid pressure so that the major portion of the weight of the vehicle may be sustained by said pressure, means on said body to sealingly and laterally circumscribe a space between said surface and said bottom portion, said means including a mouth positioned to direct a stream of fluid issuing in the form of a curtain from said mouth downwardly toward said surface and laterally of said circumscribed space with an integrated mean direction of flow which is inwards relative to said space, whereby fluid from said curtain may flow into said circumscribed space and build up therein a higher-than-atmospheric pressure retained within the said circumscribed space by said means; and means on said body for supplying pressurized fluid to said mouth.

23. A ground effect vehicle as defined in claim 22, including means for controlling the quantity of flow of fluid in at least one portion of said curtain to effect control forces for said vehicle.

24. A ground effect vehicle as defined in claim 22, including means for controlling the quantity and direction of flow of fluid in at least one portion of said curtain to effect control forces for said vehicle.

25. A ground effect vehicle as defined in claim 22, including means for controlling the direction of flow of at least one portion of said curtain.

26. A ground effect vehicle as defined in claim 22 including control means comprising movable flaps for directing predetermined portions of said curtain to effect control functions.

27. A method of continuously supporting a vehicle above a liquid or solid surface by laterally and sealingly circumscribing a space between said surface and a portion of said vehicle bottom sufficient to be acted upon by underlying fluid pressure so that the weight of the vehicle may be sustained, generating a vehicle sustaining pressure within said space such that said vehicle may hover in close proximity to said surface, and maintaining said pressurized and laterally circumscribed space, wherein said circumscribing of said space includes the formation of a relatively thin jet sheet of fluid which is directed downwardly from said vehicle toward said surface and laterally of said space with an integrated mean direction of flow which is inwards relative to said space to maintain the pressure within said space, so that said generating of said vehicle sustaining pressure includes the flow of a portion of the fluid forming said sheet into said space.

28. A method of supporting a vehicle above a liquid or solid surface by laterally and sealingly circumscribing a space between said surface and a portion of said vehicle bottom sufficient to be acted upon by underlying fluid pressure so that the weight of the vehicle may be sustained, generating a vehicle sustaining pressure within said space such that said vehicle may hover in close proximity to said surface, and maintaining said pressurized and laterally circumscribed space, wherein said circumscribing of said space includes the formation of a relatively thin jet sheet of fluid which is directed downwardly toward said surface with an inclination toward said space and laterally of said space to maintain the pressure within said space, so that said generating of said vehicle sustaining pressure includes the flow of a portion of the fluid forming said sheet into said space.

29. A method of supporting a vehicle as defined in claim 28 wherein said jet sheet circumscribes said space.

30. A vehicle of the type adapted to hover or travel over a surface at a predetermined height which is small in relation to the size of said vehicle comprising means which in operation produce and maintain a cushion of pressurised air underneath the bottom of the vehicle, said means including means for causing fluid to issue from the vehicle and form at least one curtain of moving fluid having a component of velocity across the gap existing between the bottom of said vehicle and said surface and an integrated mean direction of flow which is inwards relative to the periphery of the vehicle, means for so directing the flow of said curtain forming fluid as to produce a propulsive thrust operable to move said vehicle, means for so controlling the operation of said thrust producing means as to vary the direction of operation of said thrust upon the vehicle, and means additional to said thrust producing means for exerting about a vertical axis a turning moment upon said vehicle, whereby said vehicle is controllable as to both its direction of movement and its heading in relation to said direction of movement.

31. A vehicle of the type adapted to hover or travel over a surface at a predetermined height which is small in relation to the size of said vehicle comprising means which in operation produce and maintain a cushion of pressurised air underneath the bottom of the vehicle, said means including means for causing fluid to issue from the vehicle and form at least one curtain of moving fluid having a component of velocity across the gap existing between the bottom of said vehicle and said surface and an integrated mean direction of flow which is inwards relative to the periphery of the vehicle, means for so directing the flow of said curtain forming fluid as to produce a propulsive thrust operable to move said vehicle, means for so controlling the operation of said thrust producing means as to vary the direction of operation of said thrust upon the vehicle, and means for deflecting a part of said propulsive thrust to provide a turning moment operative about a vertical axis on said vehicle.

32. A vehicle of the type adapted to hover or travel over a surface at a predetermined height which is small in relation to the size of said vehicle and having means which in operation produce and maintain a cushion of pressurised air underneath the bottom of the vehicle, said cushion being at least in part contained by a curtain of moving fluid which issues from the bottom of the vehicle towards the surface over which the vehicle is travelling, comprising at least one supply port formed in the bottom of the vehicle adjacent the periphery thereof from which said fluid issues, hinged vanes mounted in said supply port in the path of flow of the fluid issuing therefrom, and means for deflecting said vanes differentially in groups distributed around the periphery to deflect said fluid and produce thereby a propulsive thrust which varies in magnitude and direction from point to point around the periphery whereby there may be applied to said vehicle a resultant propulsive thrust in a desired direction and a turning moment about a vertical axis so that the vehicle is controllable as to its direction of movement and its heading in relation to said direction of movement.

References Cited

UNITED STATES PATENTS

| | | |
|---|---|---|
| 936,395 | 10/1909 | Worthington. |
| 1,123,589 | 1/1915 | Porter. |
| 2,014,051 | 9/1935 | Nishi. |
| 2,377,835 | 6/1945 | Weygers. |
| 2,444,318 | 6/1948 | Warner _____ 244—23 |
| 2,567,392 | 9/1951 | Naught _____ 244—23 |
| 2,777,649 | 1/1957 | Williams _____ 244—23 |
| 2,838,257 | 6/1958 | Wibault. |
| 3,018,068 | 1/1962 | Frost et al. |
| 3,065,935 | 11/1962 | Dubbury et al. |
| 3,162,260 | 12/1964 | Cockerell _____ 180—7 |

FOREIGN PATENTS

| | | |
|---|---|---|
| 26,122 | 11/1953 | Finland. |

OTHER REFERENCES

Publication, "The Ground Effect on Lifting Propellers," by A. Betz, National Advisory Committee for Aeronautics, Techincal Memorandum No. 836, translated from "Zeitschrift fur Angewandte Mathematik und Mechanik," vol. 17, No. 2, pages 68–72, April 1937.

A. HARRY LEVY, *Primary Examiner.*

ARTHUR M. HORTON, SAMUEL BOYD, WILLIAM KANOF, PHILIP ARNOLD, *Examiners.*

R. W. ERICKSON, D. H. WARD, *Assistant Examiners.*